United States Patent
Pitcher (10) Patent No.: US 12,340,910 B2
(45) Date of Patent: Jun. 24, 2025

(54) STOCHASTIC MANTLE FOR MAGNETIC FUSION DEVICES

(71) Applicant: Charles Spencer Pitcher, Toronto (CA)

(72) Inventor: Charles Spencer Pitcher, Toronto (CA)

( * ) Notice: Subject to any disclaimer, the term of this patent is extended or adjusted under 35 U.S.C. 154(b) by 0 days.

(21) Appl. No.: 18/562,305

(22) PCT Filed: May 23, 2023

(86) PCT No.: PCT/IB2023/000315
§ 371 (c)(1),
(2) Date: Nov. 18, 2023

(87) PCT Pub. No.: WO2023/227948
PCT Pub. Date: Nov. 30, 2023

(65) Prior Publication Data
US 2024/0274304 A1    Aug. 15, 2024

Related U.S. Application Data

(60) Provisional application No. 63/345,043, filed on May 24, 2022.

(51) Int. Cl.
*G21B 1/13*    (2006.01)
*G21B 1/05*    (2006.01)

(52) U.S. Cl.
CPC .............. *G21B 1/13* (2013.01); *G21B 1/055* (2013.01)

(58) Field of Classification Search
CPC ........... G21B 1/055; G21B 1/13; G21B 1/115
See application file for complete search history.

(56) References Cited

U.S. PATENT DOCUMENTS 3,088,894 A * 5/1963 Koenig ................. G21B 1/055
                                                          376/150
3,607,627 A * 9/1971 Furth ..................... G21B 1/055
                                                          376/134
(Continued)

FOREIGN PATENT DOCUMENTS

CN    112786273 A    5/2021
ES    1091884 U    10/2013
(Continued)

OTHER PUBLICATIONS

Dux, Ralph. "Impurity transport in tokamak plasmas." (2004). (Year: 2004).*

(Continued)

*Primary Examiner* — Sharon M Davis
(74) *Attorney, Agent, or Firm* — Riverside Law LLP (57) ABSTRACT

All magnetic nuclear fusion devices face common technical challenges related to power and particle control arising from the close proximity of a thermonuclear plasma to the plasma-facing component. The plasma-facing component is subjected to high incident power density and erosion processes, and must facilitate the efficient remove of the fusion-ash. In the past, limiters and divertors have been used in magnetic fusion devices for this purpose. These are discussed and extended to a new concept, the "stochastic mantle", which utilizes a stochastic magnetic field layer to disperse power on the plasma-facing component to the maximum extent possible. Further, if operated at sufficient plasma collisionality, it reduces the energy of particles incident on the plasma-facing component, globally reducing erosion by physical sputtering, while producing high gas pressures for fusion-ash removal through pumping ducts. The approach is particular suited for stellarators, but others devices may be considered.

10 Claims, 8 Drawing Sheets

(56) References Cited

U.S. PATENT DOCUMENTS

| | | | | |
|---|---|---|---|---|
| 3,668,067 | A | * | 6/1972 | Christofilos ............ G21B 1/00 376/140 |
| 4,236,964 | A | * | 12/1980 | Bass ........................ G21B 1/11 376/137 |
| 4,560,528 | A | * | 12/1985 | Ohkawa ................. G21B 1/052 376/121 |
| 4,650,632 | A | * | 3/1987 | Kugel ..................... G21B 1/057 376/143 |
| 4,654,182 | A | * | 3/1987 | D'Aoust ................. G21B 1/13 376/136 |
| 4,668,464 | A | * | 5/1987 | Reiman .................. G21B 1/055 376/121 |
| 4,735,765 | A | | 4/1988 | Harris |
| 5,041,760 | A | * | 8/1991 | Koloc ..................... H05H 1/04 376/121 |
| 5,353,314 | A | * | 10/1994 | Schaffer ................. G21B 1/13 376/134 |
| 2018/0047461 | A1 | * | 2/2018 | Cohen .................. F03H 1/0081 |
| 2022/0208397 | A1 | | 6/2022 | Xu |
| 2023/0245792 | A1 | * | 8/2023 | Kotschenruether .... G21B 1/057 376/100 |
| 2023/0317304 | A1 | | 10/2023 | Gates |

FOREIGN PATENT DOCUMENTS

| | | | | |
|---|---|---|---|---|
| GB | 2064203 | A | * 6/1981 | ............... G21B 1/00 |
| WO | 2023178004 | A1 | 9/2023 | |
| WO | 2023178009 | A1 | 9/2023 | |
| WO | 2023178012 | A1 | 9/2023 | |

OTHER PUBLICATIONS

Finken, K. H. "Edge physics, divertors, pump limiters." Fusion science and technology 45.2T (2004): 249-255. (Year: 2004).*

Morisaki, T., et al. "Local island divertor experiments on LHD." Journal of nuclear materials 337 (2005): 154-160. (Year: 2005).*

Morisaki, T., M. Goto, and R. Sakamoto. Progress of superdense plasma research in LHD. Sustainment and transport study. No. NIFS-963. National Inst. for Fusion Science, 2010. (Year: 2010).*

Willenberg, H. J., et al. Materials flow, recycle and disposal for deuterium-tritium fusion. No. PNL-2830. Battelle Pacific Northwest Labs, Richland, WA (United States), 1978. (Year: 1978).*

Guodong Yu, Zhichen Feng, Peiyou Jiang, Nell Pomphrey, Matt Landreman, Guyong Fu,: "A Neoclassically Optimized Compact Stellarator With Four Planar Coils", arxiv.org, Cornell University Ithaca, NY, 14853, Jun. 10, 2021 (Jun. 10, 2021), XP081988047, the Whole Document.

Hammond K C et al: "Geometric Concepts for Sellarator Permanent Magnet Arrays", ARXIV.ORG, Cornell University Library, 201 Olin Library Cornelluniversity Ithaca, Aug. 13, 2020, XP081739626, DOI: 10.1088/1741-4326/ABA8C.

Caoxiang Zhu et al: "Topology Optimization of Permanent Magnets for Stellarators", Nuclear Fusion, vol. 60, No. 10, Aug. 21, 2020, p. 106002, XP020357102, ISSN: 0029-5515, DOI: 10.1088/1741-4326/ABA453.

International Search Report of PCT/US2023/063949.

Written Opinion of the Interational Searching Authority of PCT/US2023/064025.

Written Opinion of the Interational Searching Authority of PCT/US2023/064044.

Written Opinion of the Interational Searching Authority of PCT/US2023/063949.

International Search Report of PCT/IB2023/000315.

Physics of Fluids B: Plasma Physics 2, 329 (1990); Takaya Hayashi, Tetsuya Sato, and Akira Takei; Three-dimensional studies of Equilibria and magnetic surface breaking due to the finite beta effect.

J. Plasma Phys. (2017), vol. 83, 715830601; J. Loizu1,\, S. R. Hudson2 , C. Nuhrenberg1, J. Geiger1 and P. Helander1; Equilibrium β-limits in classical stellarators.

Plasma and Fusion Research: Regular Articles; Yasuhiro Suzuki, Kiyomasa Watanabe, Hisamichi Funaba, Satrou Sakakibara, Noriyoshi Nakajima, Nobuyoyshi Ohyabu and LHD experiment group; Effects of the Stochasticity on Transport Properties in High-β LHD.

Nucl. Fusion 53 (2013) 073045 (5pp); Y. Suzuki1,2, K. Ida1,2, K. Kamiya3, M. Yoshinuma1,2, S. Sakakibara1,2, K.Y. Watanabe1,2, H. Yamada1,2 and the LHD Experiment Group; 3D plasma response to the magnetic field structure in the Large Helical Device.

Plasma Phys. Control. Fusion 55 (2013) 124042 (8pp); Y Suzuki1,2, K Ida1,2, K Kamiya3, M Yoshinuma1,2, H Tsuchiya1, S Inagaki4, S Sakakibara1,2, KYWatanabe1,2, Y Narushima1,2, Ohdachi1,2, I Yamada1, R Yasuhara1, K Tanaka1, T Akiyama1, H Yamada1,2 and the LHD Experiment Group; Investigation of radial electric field in the edge region and magnetic field structure in the Large Helical Device.

Nucl. Fusion 56 (2016) 092002 (7pp); Y. Suzuki1,2, K. Ida1,2, K. Kamiya3, M. Yoshinuma1,2, H. Tsuchiya1, M. Kobayashi1,2, G. Kawamura1, S. Ohdachi1,2, S. Sakakibara1,2, K.Y. Watanabe1,2, S. Hudson4, Y. Feng5, I. Yamada1, R. Yasuhara1, K. Tanaka1, T. Akiyama1, T. Morisaki1 and The LHD Experiment Group; Impact of magnetic topology on radial electric field profile in the scrape-off layer of the Large Helical Device.

Plasma Phys. Control. Fusion 62 (2020) 104001 (9pp); Yasuhiro Suzuki1,2 翼; Effect of pressure profile on stochasticity of magnetic field in a conventional stellarator.

Phys. Plasmas 27, 102502 (2020); Y. Suzuki, 1,2,a) K. Y. Watanabe, 1,3 and S. Sakakibara1,2; Theoretical studies of equilibrium beta limit in LHD plasmas.

Nucl. Fusion 47 (2007) 572-578; A. Reiman1, M.C. Zarnstorff1, D. Monticello1, A. Weller2, J. Geiger2 and the W7-AS Team2; Pressure-induced breaking of equilibrium flux surfaces in the W7AS stellarator.

Plasma Phys. Control. Fusion 48 (2006) 157-167; Devendra Sharma, Yuhe Feng and Francesco Sardei; 3D study of energy transport and role of stochasticity in the W7-X edge.

Nucl. Fusion 64 (2024) 086030 (17pp); R. Ramasamy1,500 翼, K. Aleynikova2翼, N. Nikulsin3, F. Hindenlang1,, I. Holod1, E. Strumberger1 , M. Hoelzl1 翼 and the JOREK teama; Nonlinear MHD modeling of soft β limits in W7-AS.

Plasma Phys. Control. Fusion 63 (2021) 054002 (11pp); Allan H Reiman 翼; Pressure-driven stochastization of flux surfaces in stellarator equilibria: a review of the experimental observations and their analysis.

Plasma Phys. Control. Fusion 39 (1997) 779-930.; C S Pitcher† and P C Stangeby; Experimental divertor physics.

Journal of Nuclear Materials 24t-243 (1997) 696-700; C.S. Pitcher a,b,*, A.W. Carlson a, C. Fuchs a, A. Herrmann a, W. Suttrop~, J. Schweinzer~, M. Weinlich a, ASDEX Upgrade Team~, NBI Group; Routes to divertor detachment in ASDEX Upgrade.

Phys. Plasmas 7, 1894-1903 (2000); C. S. Pitcher; C. J. Boswell; J. A. Goetz; B. LaBombard; B. Lipschultz; J. E. Rice; J. L. Terry; The effect of divertor baffling on Alcator C-Mod discharges.

Journal of Nuclear Materials 220-222 (1995) 213-217; C.S. Pitcher 1, H .- S. Bosch, K. Biichl, A. Field, C. Fuchs, G. Haas, W. Junker, R. Neu, J. Neuhauser, U. Wenzel, ASDEX-Upgrade Team; The effect of density on divertor conditions in ASDEX-Upgrade.

Plasma Phys. Control. Fusion 60 (2018) 044001 (24pp); A W Leonard; Plasma detachment in divertor tokamaks.

Nucl. Fusion 61 (2021) 086012 (20pp); Y. Feng1• , M. Jakubowski1 , R. König1, M. Krychowiak1, M. Otte1, F. Reimold1, D. Reiter2, O. Schmitz3 , D. Zhang1, C.D. Beidler1 , C. Biedermann1, S. Bozhenkov1 , K.J. Brunner1 , A. Dinklage1, P. Drewelow1 , F. Effenberg4 , M. Endler1 , G. Fuchert1, Y. Gao1 , J. Geiger1 , K.C. Hammond4 , P. Helander1 , C. Killer1 , J. Knauer1, T. Kremeyer1 , E. Pasch1, L. Rudischhauser1, G. Schlisio1 , T. Sunn Pedersen1 , U. Wenzel1 , V. Winters1 and W7-X team1,a; Understanding detachment of the W7-X island divertor.

Plasma Science and Fusion Center Massachusetts Institute of Technology; B. Lipschultz, B. LaBombard, J.L. Terry, C. Boswell, I.H. Hutchinson; Divertor physics research on Alcator C-Mod.

(56) References Cited

OTHER PUBLICATIONS

Physics of Plasmas 23, 055602 (2016); S. I. Krasheninnikov, 1,a) A. S. Kukushkin,2,3 and A. A. Pshenov2,3; Divertor plasma detachment.

Nucl. Fusion 38 331; A. Loarte•, R.D. Monk, J.R. Martín-Solísa, D.J. Campbell•, A.V. CHANKINb, S. Clement, S.J. Davies, J. Ehrenberg, S.K. ERENTSc, H.Y. Guo, P.J. Harbour, L.D. Horton, L.C. Ingesson, H. Jackel, J. Lingertat, C.G. Lowry, C.F. Maggi, G.F. Matthews, K. McCORMICKd, D.P. O'brien, R. Reichle, G. Saibene, R.J. Smith, M.F. Stamp, D. Stork, G.C. Vlases Jet Joint Undertaking, Abingdon, Oxfordshire, United Kingdom; Plasma Detachment in Jet Mark I Divertor Experiments.

Journal of Nuclear Materials 220-222 (1995) 104-116; G.F. Matthews; Plasma detachment from divertor targets and limiters.

Plasma Phys. Control. Fusion 59 064005; V A Soukhanovskii; A review of radiative detachment studies in tokamak advanced magnetic divertor configurations.

Massachusetts Institute of Technology, Plasma Fusion Center; S.I. Krasheninnikov I, A. Yu. Pigarov IT2, D.J. Sigmar; Plasma recombination and divertor detachment.

Journal of Nuclear Materials; E. Kolemen a, ⇑, 1, S.L. Allen b,, B.D. Bray c,, M.E. Fenstermacher b,, D.A. Humphreys c,, A.W. Hyatt c, C.J. Lasnier b,, A.W. Leonard c, M.A. Makowski b,, A.G. McLean b, R. Maingi e, R. Nazikian e, T.W. Petrie c, V.A. Soukhanovskii b,, E.A. Unterberg; Heat flux management via advanced magnetic divertor configurations and divertor detachment.

\* cited by examiner

STOCHASTIC MANTLE FOR MAGNETIC FUSION DEVICES

RELATED APPLICATION

The instant application is a U.S. National Stage application of PCT Application No. PCT/IB2023/000315, filed May 23, 2023, which claims priority to and benefit of U.S. Provisional Application No. 63/345,043, filed May 24, 2022.

FIELD OF INVENTION

The present invention relates to magnetic nuclear fusion devices. More particularly, the invention relates to a mechanism to maximize the dispersal of power incident on the material surfaces that face the thermonuclear plasma, to protect theses surfaces against erosion and to optimize the removal from the vacuum vessel of the waste product particles of the nuclear fusion reaction.

BACKGROUND OF THE INVENTION

Magnetic fusion devices are designed to confine to the greatest possible extent a hot 15 plasma, typically using a closed toroidal magnetic field geometry. Examples include, tokamaks, spherical tokamaks (STs), stellarators, spheromaks and field-reversed configurations. A toroidal fusion plasma is typically housed within a surrounding plasma chamber, typically a stainless steel vacuum vessel. The vacuum vessel is first evacuated of gas before being filled with fuel gas, typically deuterium and tritium (known as DT), but other fusion fuels may also be 20 considered. The plasma heating turns the gas into plasma and sustains the process against energy losses arising from electromagnetic radiation and cross-field particle transport. The latter arises due to the fact that magnetic confinement of the plasma is not perfect and the particles and their associated energy gradually leaks out to the periphery of the core plasma to a boundary region, eventually impinging on a material surface, i.e. the plasma-facing component, typically designed to protect the stainless steel wall of the vacuum vessel.

Great care must be taken in the design of the boundary region, including the geometry of the magnetic field and the interfacing plasma-facing components. These must work together to ensure that the plasma power exhausted from the core plasma is dispersed as widely as possible in order to limit the peak surface power density. Further, it is desirable to minimize the erosion of the plasma-facing components and to efficiently remove the waste product particles (fusion-ash) created by the fusion reaction (helium-ash in the case of DT fusion). These goals must be achieved without significant degradation of the confining ability of the core plasma.

The plasma-surface interaction involving the plasma-facing components has many aspects, most of them deleterious to these structures and the confined plasma, discussed below.

Plasma-Surface Interactions

With respect to the plasma-facing components, the following may occur:
  The plasma heat flux density may be too large for the surface to handle, even with efficient active cooling, resulting in melting, evaporation and/or cracking of the surface.
  The particles of the plasma may be of sufficient energy that they may cause physical sputtering of the surface, gradually eroding the surface.
  The plasma species (typically isotopes of hydrogen) may be chemically reactive with the surface (e.g. in the case of graphite), again resulting in erosion of the surface.
  Energetic ions born in the plasma (e.g. the fusion product ions) may promptly escape the plasma and collide with the plasma-facing components with energies close to their birth energies (i.e. >1 MeV). This tends to happen at specific locations on the plasma-facing components, potentially causing over-heating and surface damage.
  Macroscopic uncontrolled movements of the plasma may occur, e.g. disruptions in tokamaks, which may damage plasma-facing components. In addition to the negative impact on the plasma-facing components, the release of 5 material from the surface into the plasma inevitably suppresses the thermonuclear reaction rate, either by cooling the plasma through radiative processes or by dilution of the fusion reactants in the plasma.

The interaction of the boundary plasma with the plasma-facing component results in the conversion of plasma ions on the material surface into corresponding neutral atoms and molecules (in the case of a hydrogenic plasma). Atom formation may also occur in the volume, typically close to the plasma-facing component by radiative recombination and molecule-assisted recombination. The presence of neutral particles, in particular neutralized fusion-ash particles, provides an opportunity for the removal of the fusion-ash via pumping ducts leading to vacuum pumps, provided sufficiently high gas pressure is generated to make the process efficient.

Associated Cost of Maintenance

The erosion and general degradation of the plasma-facing components necessitates maintenance, replacement and disposal activities at time intervals typically much shorter than the lifetime of the balance of the fusion power plant.

These are costly activities in many ways, discussed below:
  The fusion device must be designed to allow ready access for robotic maintenance systems (as radiation levels typically preclude human access). Such access can jeopardize the
  geometry of the magnetic field coils of the fusion device, which otherwise need to be designed to optimize plasma confinement.
  The robotic systems themselves are large and expensive, but are necessary in order to perform maintenance activities in the hazardous environment inside of the vacuum vessel.
  They may also fail and therefore themselves need robotic systems to rescue them.
  The replacement of plasma-facing components by robotic means invariably takes a long time, strongly affecting the availability of the fusion device.
  The robotic systems and the wasted components need a large support facility away from the fusion device, sometimes called a "Hot Cell". This is typically as big as the fusion device facility itself.
  The waste components are radioactive waste (radwaste), which must be stored and disposed of with special precautions. The faster the degradation of in-vessel components, the greater the rate of radwaste generation, the greater the disposal costs, and the less time the fusion device is available to operate.

All of the above activities contribute substantially to both the capital cost and operating cost of a fusion power plant and are directly influenced by the lifetime of the plasma-facing components.

Types of Plasma-Facing Components

Over many decades of magnetic fusion research, a number of different types of plasma-facing components have been used with varying success to receive the plasma power, to minimize the erosion rate and to provide for the removal of the fusion-ash. These are summarized below.

Limiters

This was the first type of approach commonly used for plasma-facing components and had application to most types of magnetic fusion devices. The limiter is attached to the vacuum vessel and protrudes beyond other plasma-facing components into the plasma to ensure that it represents the point of first contact for the plasma, see A, corresponding to the last closed flux surface (LCFS) of the nested closed magnetic flux surfaces that provide the plasma confinement. As it receives a high heat flux, it is typically constructed from a refractory material, e.g. tungsten or nuclear-grade graphite, and may be passively or actively-cooled, depending on the duration of the plasma operation.

Limiters are effective at taking the brunt of the particle power coming out of the plasma and providing protection for the remaining plasma-facing components, and have been effective at widely dispersing power, provided large areas are utilized for receiving the power, as indicated in. However, limiters have not been effective at minimizing the erosion rate of its surface, nor for the efficient removal of the fusion-ash.

Divertors

Although proposed very early in the history of fusion research, the divertor approach was only used commonly after the limiter approach, representing a general improvement in performance over the limiter approach. In this case, the magnetic geometry of the plasma boundary is configured to "divert" the magnetic field, and therefore the boundary plasma, to a location somewhat removed from the core plasma (see FIG. 1B). By doing so, it is possible to reduce the energy of particles impinging on the divertor plate surface, thus reducing erosion by physical sputtering, and to make it more difficult for any released material to enter the core plasma. The divertor, however, tends to focus the exhausted plasma power to localized points on the divertor plate, i.e. "divertor strike points", which makes heat removal challenging at these locations.

The divertor has the advantage of enhancing the gas density arising from the neutralization of the plasma at the divertor plate, including the density of the fusion-ash. A divertor baffle is typically employed around the divertor plate to prevent the escape of gas, enhancing the gas pressure, making it an efficient location to put a pumping duct and to apply gas pumping to remove the fusion-ash from the vacuum chamber. The divertor plate and baffle, however, constrain the location of the pumping duct, its associated nuclear shielding (if any), the plasma shape and the plasma positioning.

First-Wall and Blanket

While the limiter and divertor approaches define the boundary of the plasma, there is still a significant fraction of the fusion power and particles which may impinge on the remaining plasma-facing components arising from the following:

The prompt escape of energetic fusion products particles (neutrons and ions).
Plasma that may diffuse rapidly across the magnetic field lines.
Neutral hydrogenic particles, which may cross field lines through charge-exchange processes.
Electromagnetic radiation emanating from the plasma.

These power and particle fluxes necessitate additional protection of the wall with specially designed plasma-facing components.

In the case of the neutrons, as these are energetic enough to pass through thin structures, including the vacuum vessel, protection is also needed for the magnetic coils, the balance of the plant and the facility operators. Approximately 1.0 m of actively-cooled shielding is required—the "blanket" (see FIG. 1B). The blanket is capable of stopping the neutrons and removing the associated power. It also serves as a location to breed tritium from lithium in the case of DT fusion.

Figure 1A:
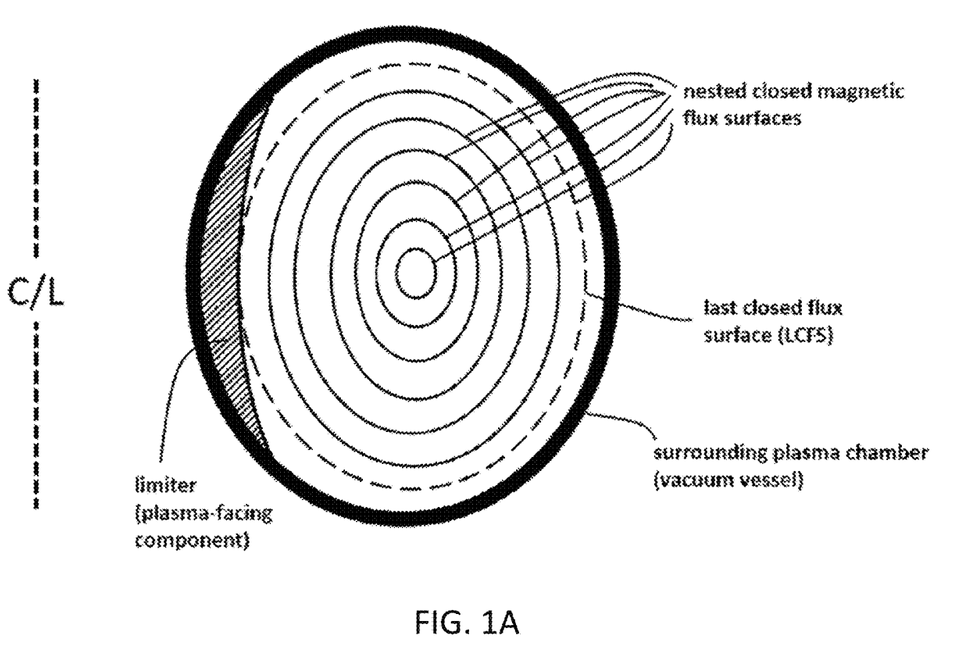
FIG. 1A depicts a generic toroidal magnetic fusion device showing the utilization of a limiter.
Figure 1B:
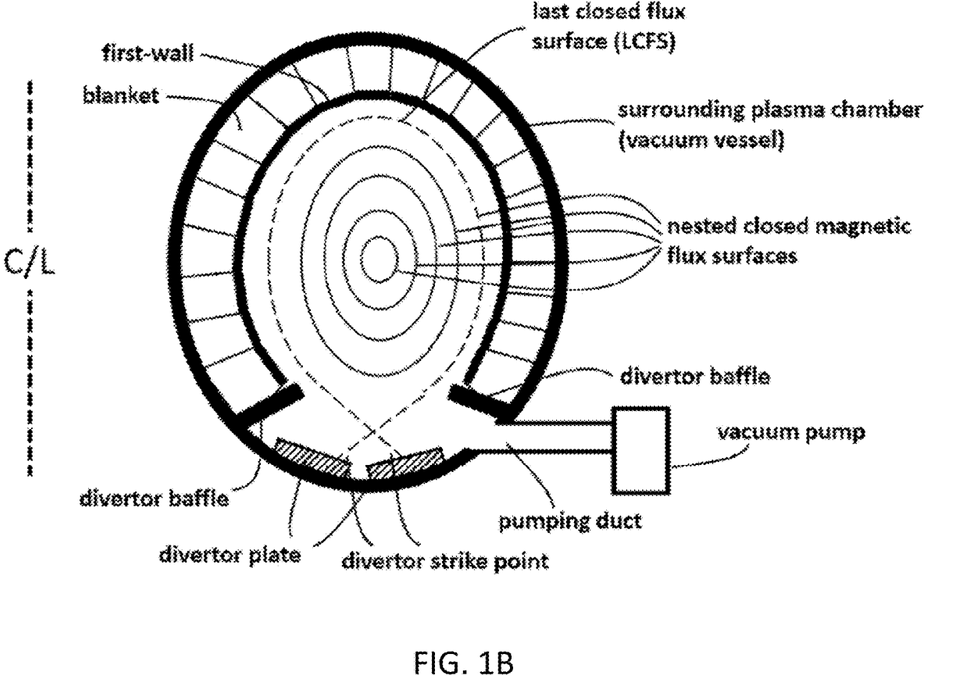
FIG. 1B depicts a generic toroidal magnetic fusion device showing the utilization of a divertor.

With respect to the balance of the power flux to the wall, an actively-cooled structure is required to remove the power incident on the surface of the blanket, i.e. the "first-wall" (see FIG. 1B). While the power flux density is well below of that experienced at limiters and divertors (at least under normal operating conditions), the first-wall is still subjected to the bombardment of ions and atoms leaving the plasma, resulting in erosion processes, normally dominated by physical sputtering.

Plasma-Facing Components—Summary of Issues

While the divertor approach has historically improved many aspects of the limiter approach, residual problems remain, including, 1. Exhausted power tends to be focused at a relatively small fraction of the material surfaces facing the plasma (at divertor strike points), challenging the power removal technology of the divertor plate and limiting its lifetime.
2. Surface degradation of plasma-facing components still occurs at most locations around the periphery of the plasma, including both the divertor and the first-wall, due to incident particle bombardment, primarily due to physical sputtering, limiting their lifetime.
3. Fusion-ash gas can only be removed at specific locations which require specialized hardware (i.e. divertor plates and divertor baffles), highly constraining the location of pumping ducts, the associated nuclear shielding (if any), the plasma shape and the plasma positioning.

A Better Solution—the Stochastic Mantle

In this application, a solution is identified that solves the residual problems of the divertor approach arising from the power dispersal and the erosion of the placing-facing components, and that further improves the fusion-ash removal. The solution is the "stochastic mantle" concept. Although, it is particularly suited for the stellarator approach to magnetic fusion, described below, it need not be limited to this type of device and may find application to other forms of magnetic fusion devices.

A first objective of the present invention is to disperse the power leaving the core plasma to the widest possible extent. This ensures that the power is as uniformly incident on the plasma-facing components to the greatest possible extent. This reduces the peak power density in the fusion device, ensuring that the peak power density is as close as possible to the average power density. This eases the engineering of the active heat-removal design, invariably reducing its cost, increasing reliability and lifetime.

A second objective of the invention is to reduce, and even eliminate, the erosion by physical sputtering of all plasma-facing components by reducing the energy of incident ions and atoms at all locations. This increases the lifetime of the plasma-facing components, decreases the generation of retired components that become radwaste, increases the availability of the fusion device, which altogether decreases the operating cost of the fusion power plant.

A third objective is to enhance and simplify the removal of the fusion-ash gas from the vacuum vessel by increasing the gas pressure at the plasma-facing components in the vicinity of pumping ducts and by removing the requirement for localized divertor baffling. The former allowing the use of smaller pumping ducts and vacuum pumps, thus easing nuclear shielding requirements, thus reducing capital costs. The latter giving freedom and flexibility with respect to the location of the pumping ducts, the associated nuclear shielding, the plasma shape and the plasma positioning.

While some of the objectives of the present invention are disclosed in the prior art, none of the inventions found address all of the objectives identified.

Definitions engineering limits for power removal—The engineering of power removal surfaces requires the respect of material limits for temperature, mechanical stress, thermal conductivity, and coolant medium physical properties.

thermonuclear plasma conditions—Conditions within the plasma having sufficient density and temperature that thermonuclear reactions occur.

poloidal direction—In a toroidal plasma, a direction that is orthogonal to both the radial and toroidal directions.

charge-exchange processes—A process by which an atom or a molecule exchanges an electron with a plasma ion, whereby the plasma ion becomes a neutral atom and is no longer confined by the magnetic field.

physical sputtering—A process by which ions and atoms incident on the plasma-facing component have sufficient energy to liberate surface atoms from the surface by physical collisions.

parallel electron heat conduction—Conduction of plasma heat along magnetic field lines in the parallel-field direction by plasma electrons, owing to the presence of a temperature gradient, with conduction from the high temperature location to the low temperature location.

atomic radiative process—Processes involving the collisional excitation of bound electrons in atoms by the free electrons in the mantle plasma.

molecular radiative process—Processes involving the collisional excitation of bound electrons in molecules by the free electrons in the mantle plasma.

recombination processes—Processes that result in the neutralization of plasma ions caused by recombination with an electron, either occurring on the surface of the plasma-facing component with an electron supplied by the surface, or in the volume by recombination with a plasma electron. There are several types of volume recombination, including radiative recombination and molecule assisted recombination.

molecule formation process—Processes that result in the formation of molecules from its constituent atoms, typically occurring on the surface of the plasma-facing component.

SUMMARY OF THE INVENTION

1) A stellarator fusion reactor satisfying the objectives identified above can be constructed from the following components. A core plasma is provided. The core plasma is configured by a core magnetic geometry. The core magnetic geometry includes nested, closed, three-dimensional toroidal magnetic flux surfaces. The core magnetic geometry is created by a combination of external magnets and internal electric currents flowing within the core plasma. The core magnetic geometry confines the core plasma against energy losses by particle and thermal transport across and along magnetic field lines. This confinement allows attainment of thermonuclear plasma conditions, resulting in nuclear fusion reactivity and generating energetic fusion product particles. The energetic fusion product particles include neutrons and ions.

A surrounding plasma chamber is provided. The surrounding plasma chamber has an interior plasma-facing component. The interior plasma-facing component is actively-cooled in order to receive power leaving the core plasma, while maintaining the interior plasma-facing component within engineering limits for power removal. A stochastic mantle is provided. The stochastic mantle is located outside of the core magnetic geometry and has a stochastic magnetic field. The stochastic magnetic field has magnetic fields lines circumnavigating the stellarator fusion reactor, moving in a toroidal direction, diffusing randomly in both a radial direction and a poloidal direction A portion of the magnetic fields lines intersect the internal plasma-facing component of the surrounding plasma chamber.

A mantle plasma is provided. The mantle plasma is present in the stochastic mantle. The mantle plasma includes ions, electrons, atoms and molecules. A fusion-ash is created. The fusion-ash includes particles created as energetic fusion ions, after the energetic fusion ions lose energy and reach a temperature of local conditions in the core plasma and the mantle plasma. A conducted power is created. The conducted power is created in the core plasma and moves to a periphery of the core plasma. The stochastic mantle conveys the conducted power to the interior plasma-facing component along the stochastic magnetic field by particle and thermal transport.

The stochastic magnetic field is configured with the combination of external magnets and internal electric currents flowing within the core plasma to provide uniform deposition of the conducted power on a surface of the interior plasma-facing component.

2) In a variant of the invention, the stochastic mantle further includes a last closed flux surface (LCFS). The LCFS marks an outermost flux surface of the core magnetic geometry.

The LCFS provides a boundary between the core plasma and the mantle plasma. The stochastic magnetic field ensures that parallel plasma transport processes in the mantle plasma result in similar plasma transport processes in the radial direction. The mantle plasma is subject to heat conduction, convection and electromagnetic radiation.

A connection length L is provided. The connection length L is a distance from a location within the stochastic mantle along the stochastic magnetic field which intersects the interior plasma-facing component. The connection length L is a maximum for field lines originating adjacent the LCFS. The mantle plasma has a high collisionality. The high collisionality arises from an electron mean free path along field lines shorter than the connection length L from the LCFS throughout the stochastic mantle.

3) In another variant, the stochastic mantle further includes an opaque condition within the mantle plasma. The opaque condition ensures that the atoms and the molecules entering the stochastic mantle adjacent the interior plasma-facing component are screened by ionization processes within the mantle plasma before reaching the LCFS. The opaque condition within the stochastic mantle ensures that the conducted power coming from the core plasma enters the stochastic mantle by conduction.

The opaque condition within the stochastic mantle, prevents creation of energetic atoms by charge-exchange processes inside the LCFS, preventing energy loss by the energetic atoms from the core plasma and eliminating potential for physical sputtering by the energetic atoms of the interior plasma-facing component.

4) In still another variant, the stochastic mantle further includes a conduction-limited layer. The conduction-limited layer transmits power by parallel electron heat conduction. The stochastic magnetic field ensures that the parallel electron heat conduction results in radial electron heat conduction. The conduction-limited layer is located adjacent to the LCFS and extends radially outward into the stochastic mantle. The conduction-limited layer results from high plasma collisionality and an absence of convection resulting from the opaque plasma condition. The conduction-limited layer supports a first mantle plasma temperature adjacent the LCFS and a second, lower mantle plasma temperature adjacent the interior plasma-facing component.

The second lower mantle plasma temperature adjacent to the interior plasma-facing component ensures lower particle energies for particles striking the interior plasma-facing component. The low particle energies reduce physical sputtering, thereby reducing erosion of the interior plasma-facing component. A mantle plasma pressure is created. The mantle plasma pressure is created within the stochastic mantle and is a product of a mantle plasma density and the second, lower mantle plasma temperature. The conduction-limited layer and the absence of convection ensures that the mantle plasma pressure is conserved along the stochastic magnetic field in the conduction-limited layer. A radial decrease in the second, lower plasma temperature results in a radial rise in the mantle plasma density within the conduction-limited layer.

5) In still another variant, the stochastic mantle further includes a dissipative layer. The dissipative layer includes the atoms and the molecules. Interaction between the mantle plasma and the atoms and the molecules results in dissipative processes. The dissipative layer is located in a region of the second, lower mantle plasma temperature outside of the conduction-limited layer and adjacent to the interior plasma-facing component as a result of the opaque condition.

The dissipative processes within the dissipative layer include ionization of the atoms and the molecules, dissociation of the molecules, an atomic radiative process, molecular radiative processes, bremsstrahlung radiation from the electrons in the mantle plasma, recombination processes and a molecule formation process. The dissipative processes occur in a volume of the dissipative layer and adjacent to the surface of the interior plasma-facing component. The fusion-ash is present in the mantle plasma. The fusion-ash becomes the fusion-ash gas by the recombination processes.

The dissipative processes reduce the second, lower mantle plasma temperature in the dissipative layer adjacent the interior plasma-facing component. This reduced second, lower mantle plasma temperature ensuring lower particle energies for particles striking the interior plasma-facing component. The lower particle energies reduce the physical sputtering, thereby reducing erosion of the interior plasma-facing component. A gas pressure is created. The gas pressure within the dissipative layer, adjacent the plasma-facing component, is a sum of a pressure of the atoms, a pressure of the molecules and a pressure of the fusion-ash gas. The dissipative layer increases the gas pressure adjacent the interior plasma-facing component to facilitate removal of gas and the fusion-ash gas through pumping ducts exiting the surrounding plasma chamber through vacuum pumps. The gas and fusion-ash gas surrounding the periphery of the core plasma, allow placement of the pumping ducts around the periphery of the core plasma.

6) A magnetic fusion device employing the stochastic mantle technology can be constructed from the following components. A toroidal fusion plasma that has a toroidal fusion core plasma is provided. The toroidal fusion core plasma is created by a combination of external magnets and internal electric currents flowing within the toroidal fusion core plasma. The toroidal fusion core plasma has energy losses by particle and thermal transport across and along magnetic field lines, the energy losses carrying power to a periphery of the toroidal fusion core plasma. The magnetic fusion device has a surrounding plasma chamber. The surrounding plasma chamber has an interior plasma-facing component. The interior plasma-facing component is actively-cooled in order to receive the power, while maintaining the interior plasma-facing component within engineering limits for power removal.

A stochastic mantle is provided. The stochastic mantle includes mantle plasma and is located outside of the toroidal fusion core plasma. The stochastic mantle has a stochastic magnetic field, the stochastic magnetic field has magnetic fields lines that circumnavigate the toroidal fusion plasma. The magnetic field lines move in a toroidal direction and diffuse in both radial and poloidal directions. A first portion of the magnetic field lines intersect the internal plasma-facing component of the surrounding plasma chamber. The stochastic mantle allows energy losses from the toroidal fusion core plasma to the interior plasma-facing component along the magnetic field lines by particle and thermal transport.

The stochastic mantle is generated without degrading confinement of the toroidal fusion core plasma. The stochastic mantle is configured with the magnetic field lines providing a flux of particles, plasma momentum and energy along the magnetic field lines corresponding to radial flux based on the stochastic magnetic field. The first portion of the magnetic field lines that intersect with the interior plasma-facing component is configured with the combination of external magnets and internal electric currents flowing within the toroidal fusion core plasma to provide uniform deposition of the power incident on a surface of the interior plasma-facing component. The stochastic mantle separates the toroidal fusion core plasma from the interior plasma-facing component. The stochastic mantle has a first radial width and high collisionality. The first radial width and the high collisionality permit development of parallel-field plasma temperature gradients and dissipative processes. The parallel-field plasma temperature gradients and dissipative processes provide cold plasma conditions adjacent the interior plasma-facing component.

The cold plasma conditions adjacent to the interior plasma-facing component provide low particle energies for the particles striking the interior plasma-facing component. The low particle energies reduce physical sputtering, thereby reducing erosion of the interior plasma-facing component. The dissipative processes within the stochastic mantle include plasma-neutral interactions with neutral particles. The plasma-neutral interactions elevate gas pressure adjacent the interior plasma-facing component to facilitate removal of fusion-ash gas through pumping ducts connected to vacuum pumps. The gas pressure and fusion-ash gas surround the periphery of the toroidal fusion core plasma to permit placement of the pumping ducts around the periphery of the core plasma.

The stochastic mantle includes an inner, conduction-limited layer and an outer, dissipative layer. The inner conduction-limited layer transmits power by parallel electron heat conduction. The outer, dissipative layer, where the atoms and the molecules are present provides dissipative processes by an interaction of the mantle plasma with the atoms and the molecules.

The stochastic mantle protects the interior plasma-facing component of the magnetic fusion device as the stochastic mantle is global and uniform.

7) In a further variant of the invention, the stellarator fusion reactor further includes an energetic fusion product ion loss process. The energetic fusion product ion loss process arises from a portion of energetic fusion product ions not transferring energy to the core plasma. This portion of the energetic fusion product ions escape the core plasma and reach the periphery of the core plasma. The stochastic mantle provides protection of the interior plasma-facing component against the energetic fusion product ion loss process. The protection provided by the mantle plasma, includes the atoms and the molecules which reduce energy of the energetic fusion product ions exiting from the core plasma through a friction process, globally protecting the interior plasma-facing components from excessive local incident power density and damage.

8) In a final variant of the invention, the magnetic fusion device further includes an energetic fusion product ion loss process. The energetic fusion product ion loss process arises from a portion of energetic fusion product ions not transferring energy to the toroidal fusion core plasma. This portion of the energetic fusion product ions escape the toroidal fusion core plasma and reach the periphery of the toroidal fusion core plasma. The stochastic mantle provides protection of the interior plasma-facing component against the energetic fusion product ion loss process. The protection provided by the mantle plasma, includes the atoms and the molecules which reduce energy of the energetic fusion product ions exiting from the toroidal fusion core plasma through a friction process, globally protecting the interior plasma-facing components from excessive local incident power density and damage.

DETAILED DESCRIPTION OF THE PREFERRED EMBODIMENT

Figure 3:
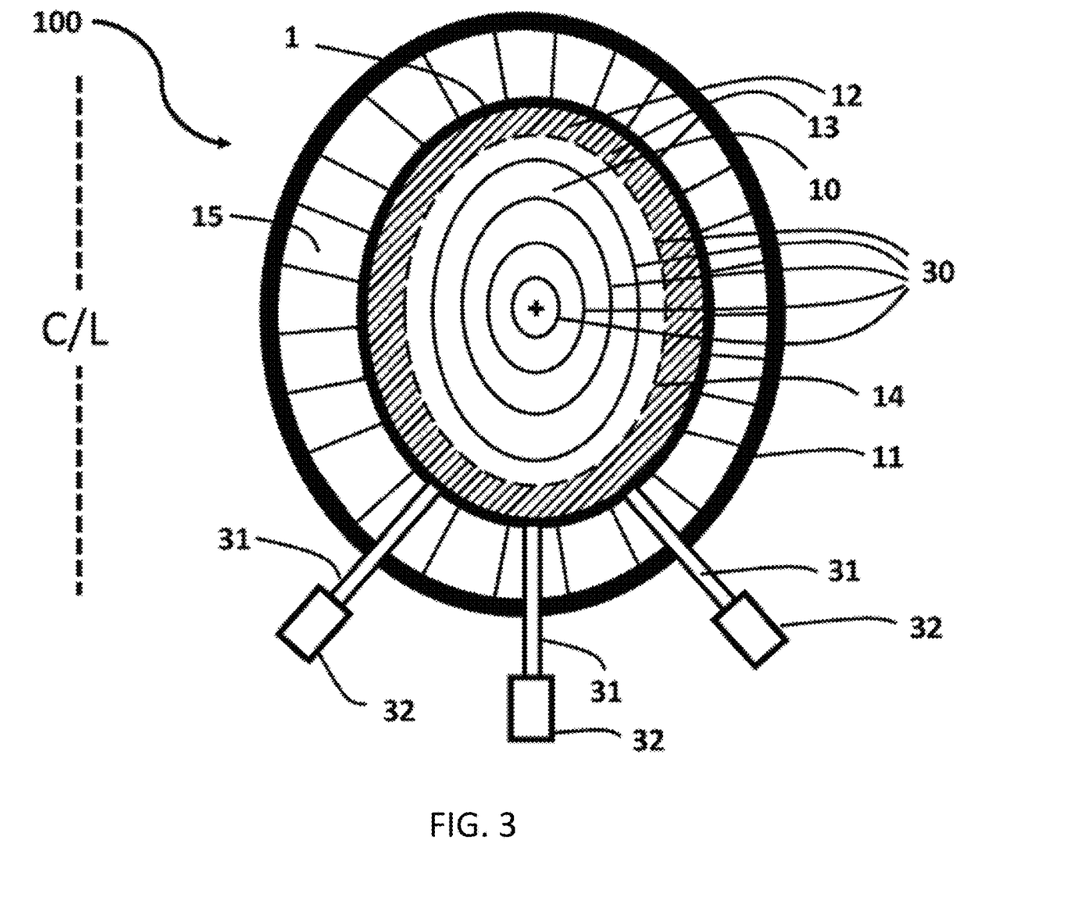
FIG. 3 is a vertical section through a stellarator fusion reactor showing the utilization of the stochastic mantle to define the plasma boundary. Note, the use of divertor plates and divertor baffles are not required, allowing freedom with respect to the location of pumping ducts and vacuum pumps. Nuclear shielding associated with the pumping duct is not shown. "C/L" refers to the center-line of the stellarator fusion reactor.
Figure 4:
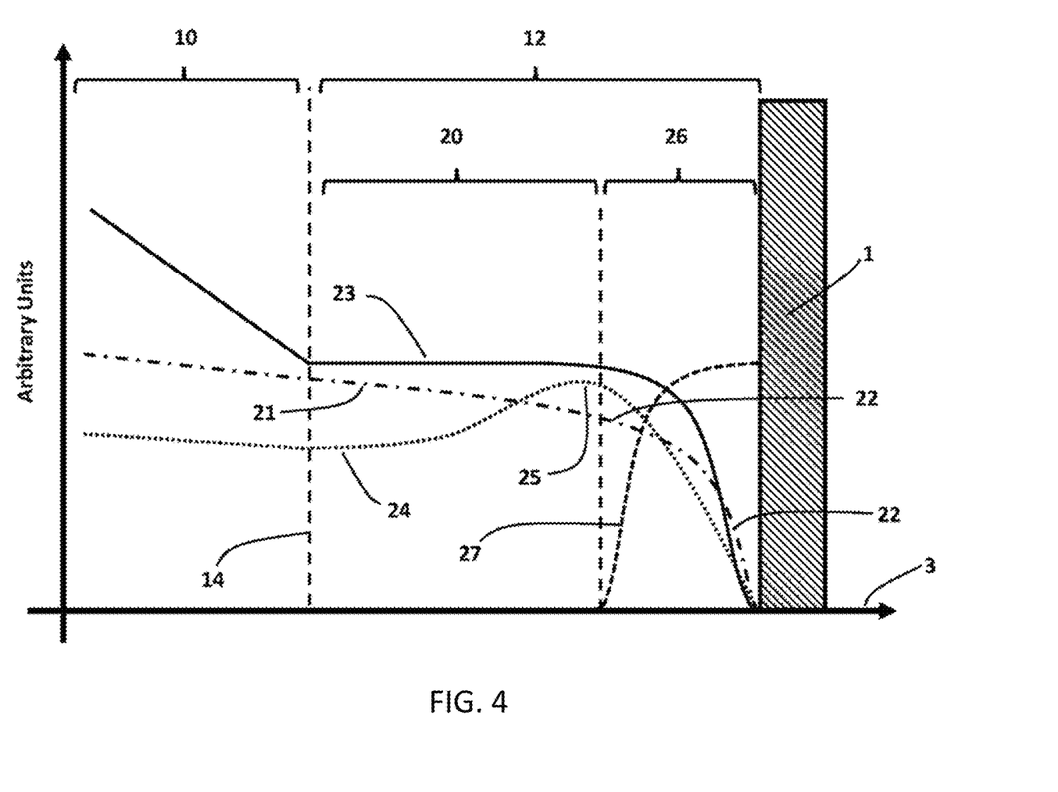
FIG. 4 Is a graph illustrating the radial dependencies of plasma conditions within the core plasma (confined) and stochastic mantle (mantle plasma) of a stellarator fusion reactor, including plasma temperature, density and pressure, and gas pressure, under conditions of a stochastic magnetic field within the mantle plasma and high plasma collisionality. The conduction-limited and dissipative layers are indicated.

1) As illustrated in FIGS. 3 and 4, a stellarator fusion reactor 100 satisfying the objectives identified above can be constructed from the following components. A core plasma 10 is provided. The core plasma 10 is configured by a core magnetic geometry. The core magnetic geometry includes nested, closed, three-dimensional toroidal magnetic flux surfaces 30 as shown in FIG. 3. The core magnetic geometry is created by a combination of external magnets and internal electric currents flowing within the core plasma 10. The core magnetic geometry confines the core plasma 10 against energy losses by particle and thermal transport across and along magnetic field lines. This confinement allows attainment of thermonuclear plasma conditions, resulting in nuclear fusion reactivity and generating energetic fusion product particles. The energetic fusion product particles include neutrons and ions.

Figure 1C:
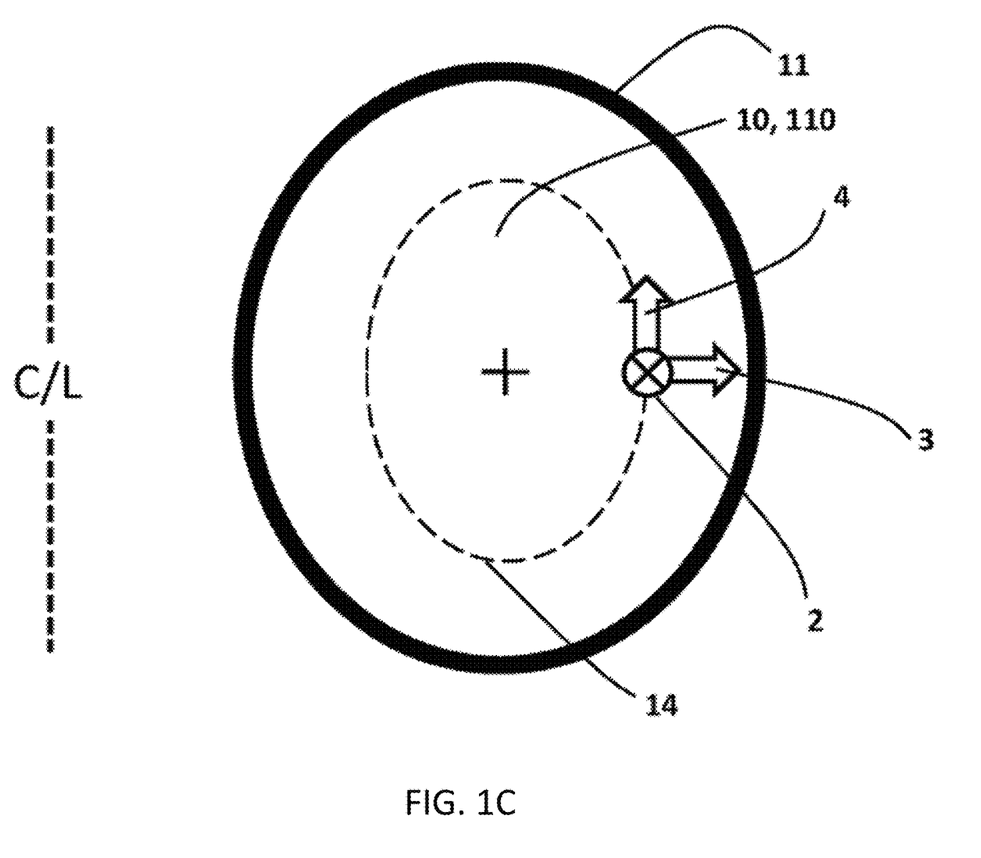
FIG. 1C is a vertical section through a generic toroidal magnetic fusion device showing its basic features and reference directions, i.e. toroidal, radial and poloidal directions. "C/L" refers to the center-line of the toroidal magnetic fusion device.
Figure 2:
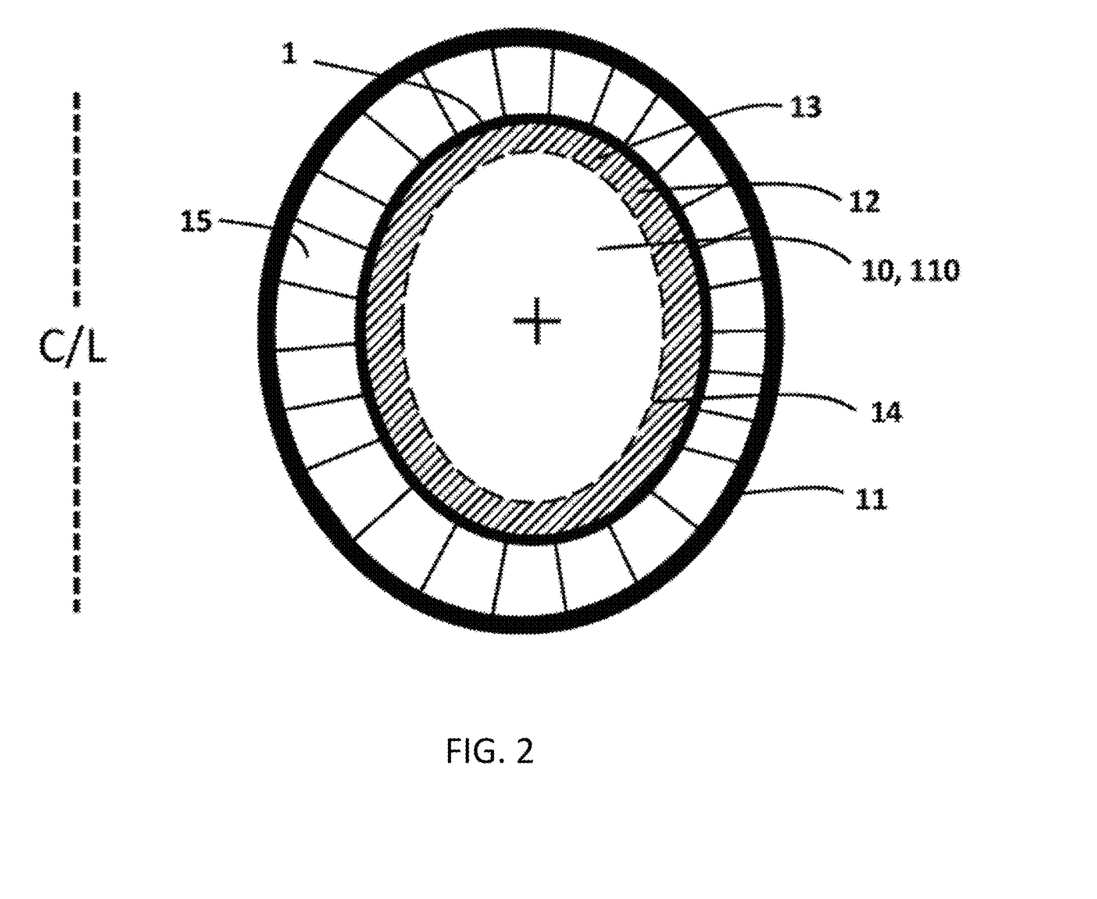
FIG. 2 is a vertical section through a generic toroidal magnetic fusion device showing the utilization of the stochastic mantle to define the plasma boundary and its relationship to the core plasma and the plasma-facing component. "C/L" refers to the center-line of the toroidal magnetic fusion device.

A surrounding plasma chamber 11 is provided. The surrounding plasma chamber 11 has an interior plasma-facing component 1. The interior plasma-facing component 1 is actively-cooled in order to receive power leaving the core plasma 10, while maintaining the interior plasma-facing component 1 within engineering limits for power removal. A stochastic mantle 12 is provided. The stochastic mantle 12 is located outside of the core magnetic geometry and has a stochastic magnetic field. The stochastic magnetic field has magnetic fields lines circumnavigating the stellarator fusion reactor 100, moving in a toroidal direction 2, diffusing randomly in both a radial direction 3 and a poloidal direction 4, as illustrated in FIG. 1C. A portion of the magnetic field lines intersect the internal plasma-facing component 1 of the surrounding plasma chamber 11, as shown in FIG. 3.

A mantle plasma 13 is provided. The mantle plasma 13 is present in the stochastic mantle 12. The mantle plasma 13 includes ions, electrons, atoms and molecules. A fusion-ash is created. The fusion-ash includes particles created as energetic fusion ions, after the energetic fusion ions lose energy and reach a temperature of local conditions in the core plasma 10 and the mantle plasma 13. A conducted power is created. The conducted power is created in the core plasma 10 and moves to a periphery of the core plasma 10. The stochastic mantle 12 conveys the conducted power to the interior plasma-facing component 1 along the stochastic magnetic field by particle and thermal transport. The stochastic magnetic field is configured with the combination of external magnets and internal electric currents flowing within the core plasma 10 to provide uniform deposition of the conducted power on a surface of the interior plasma-facing component 1.

2) In a variant of the invention, the stochastic mantle 12 further includes a last closed flux surface (LCFS) 14. The LCFS 14 marks an outer most flux surface of the core magnetic geometry. The LCFS 14 provides a boundary between the core plasma 10 and the mantle plasma 13. The stochastic magnetic field ensures that parallel plasma transport processes in the mantle plasma 13 result in similar plasma transport processes in the radial direction 3. The mantle plasma 13 is subject to heat conduction, convection and electromagnetic radiation.

A connection length L is provided. The connection length L is a distance from a location within the stochastic mantle 12 along the stochastic magnetic field which intersects the interior plasma-facing component 1. The connection length L is a maximum for field lines originating adjacent the LCFS 14. The mantle plasma 13 has a high collisionality. The high collisionality arises from an electron mean free path along field lines shorter than the connection length L from the LCFS throughout the stochastic mantle 12.

3) In another variant, the stochastic mantle 12 further includes an opaque condition within the mantle plasma 13. The opaque condition ensures that the atoms and the molecules entering the stochastic mantle 12 adjacent the interior plasma-facing component 1 are screened by ionization processes within the mantle plasma 13 before reaching the LCFS 14. The opaque condition within the stochastic mantle 12 ensures that the conducted power coming from the core plasma 10 enters the stochastic mantle 12 by conduction.

The opaque condition within the stochastic mantle 12, prevents creation of energetic atoms by charge-exchange processes inside the LCFS 14, preventing energy loss by the energetic atoms from the core plasma 10 and eliminating potential for physical sputtering by the energetic atoms of the interior plasma-facing component 1.

4) In still another variant, as illustrated in FIGS. 3 and 4, the stochastic mantle 12 further includes a conduction-limited layer 20. The conduction-limited layer 20 transmits power by parallel electron heat conduction. The stochastic magnetic field ensures that the parallel electron heat conduction results in radial electron heat conduction. The conduction-limited layer 20 is located adjacent to the LCFS 14 and extends radially outward into the stochastic mantle 12. The conduction-limited layer 20 results from high plasma collisionality and an absence of convection resulting from the opaque plasma condition. The conduction-limited layer 20 supports a first mantle plasma temperature 21 adjacent the LCFS 14 and a second, lower mantle plasma temperature 22 adjacent the interior plasma-facing component 1.

The second lower mantle plasma temperature 22 adjacent to the interior plasma-facing component 1 ensures lower particle energies for particles striking the interior plasma-facing component 1. The low particle energies reduce physical sputtering, thereby reducing erosion of the interior plasma-facing component 1. A mantle plasma pressure 23 is created. The mantle plasma pressure 23 is created within the stochastic mantle 12 and is a product of a mantleplasma density 24 and the second, lower mantle plasma temperature 22. The conduction-limited layer 20 and the absence of convection ensures that the mantle plasma pressure 23 is conserved along the stochastic magnetic field in the conduction-limited layer 20. A radial decrease in the second, lower plasma temperature 22 results in a radial rise 25 in the mantle plasma density 24 within the conduction-limited layer 20.

5) In still another variant, the stochastic mantle 12 further includes a dissipative layer 26. The dissipative layer 26 includes the atoms and the molecules. Interaction between the mantle plasma 13 and the atoms and the molecules results in dissipative processes. The dissipative layer 26 is located in a region of the second, lower mantle plasma temperature 22 outside of the conduction-limited layer 20 and adjacent the interior plasma-facing component 1 as a result of the opaque condition.

The dissipative processes within the dissipative layer 26 include ionization of the atoms and the molecules, dissociation of the molecules, an atomic radiative process, molecular radiative processes, bremsstrahlung radiation from the electrons in the mantle plasma 13, recombination processes and a molecule formation process. The dissipative processes occur in a volume of the dissipative layer 26 and adjacent to the surface of the interior plasma-facing component 1. The fusion-ash is present in the mantle plasma 13. The fusion-ash becomes the fusion-ash gas by the recombination processes.

The dissipative processes reduce the second, lower mantle plasma temperature 22 in the dissipative layer 26 adjacent the interior plasma-facing component 1. This reduced second, lower mantle plasma temperature 22 ensuring lower particle energies for particles striking the interior plasma-facing component 1. The lower particle energies reduce the physical sputtering, thereby reducing erosion of the interior plasma-facing component 1. A gas pressure 27 is created. The gas pressure 27 within the dissipative layer 26, adjacent the plasma-facing component 1, is a sum of a pressure of the atoms, a pressure of the molecules and a pressure of the fusion-ash gas. The dissipative layer 26 increases the gas pressure 27 adjacent the interior plasma-facing component 1 to facilitate removal of gas and the fusion-ash gas through pumping ducts 31 exiting the surrounding plasma chamber 11 through vacuum pumps 32. The gas and fusion-ash gas surrounding the periphery of the core plasma 10, allow placement of the pumping ducts 31 around the periphery of the core plasma 10.

6) As illustrated in FIGS. 1, 2, 5 and 6, a magnetic fusion device 101 employing the stochastic mantle 12 technology can be constructed from the following components. A toroidal fusion plasma that has a toroidal fusion core plasma 110 is provided. The toroidal fusion core plasma 110 is created by a combination of external magnets and internal electric currents flowing within the toroidal fusion core plasma 110. The toroidal fusion core plasma 110 has energy losses by particle and thermal transport across and along magnetic field lines, the energy losses carrying power to a periphery of the toroidal fusion core plasma 110. The magnetic fusion device has a surrounding plasma chamber 11. The surrounding plasma chamber 11 has an interior plasma-facing component 1. The interior plasma-facing component 1 is actively-cooled in order to receive the power, while maintaining the interior plasma-facing component 1 within engineering limits for power removal.

Figure 5:
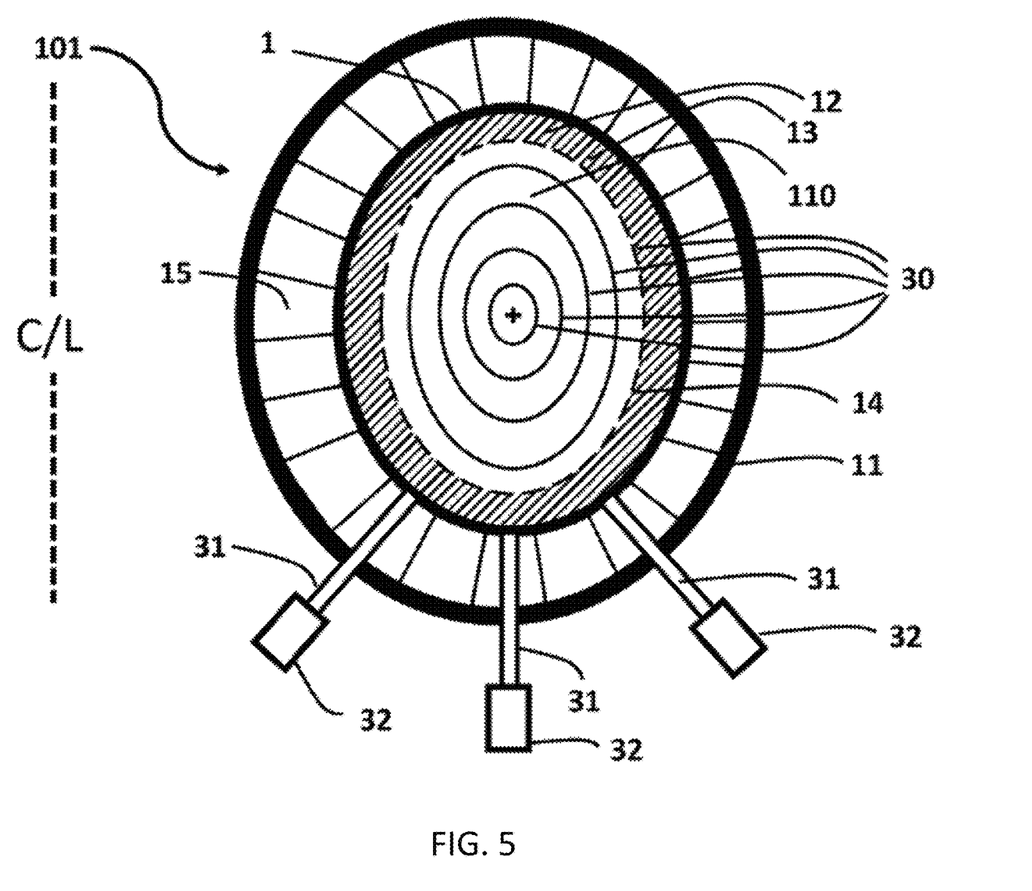
FIG. 5 is a vertical section through a magnetic fusion device with toroidal geometry showing the utilization of the stochastic mantle to define the plasma boundary. Note, the use of divertor plates and divertor baffles are not required, allowing freedom with respect to the location of pumping ducts and vacuum pumps. Nuclear shielding associated with the pumping duct is not shown. "C/L" refers to the center-line of the magnetic fusion device.
Figure 6:
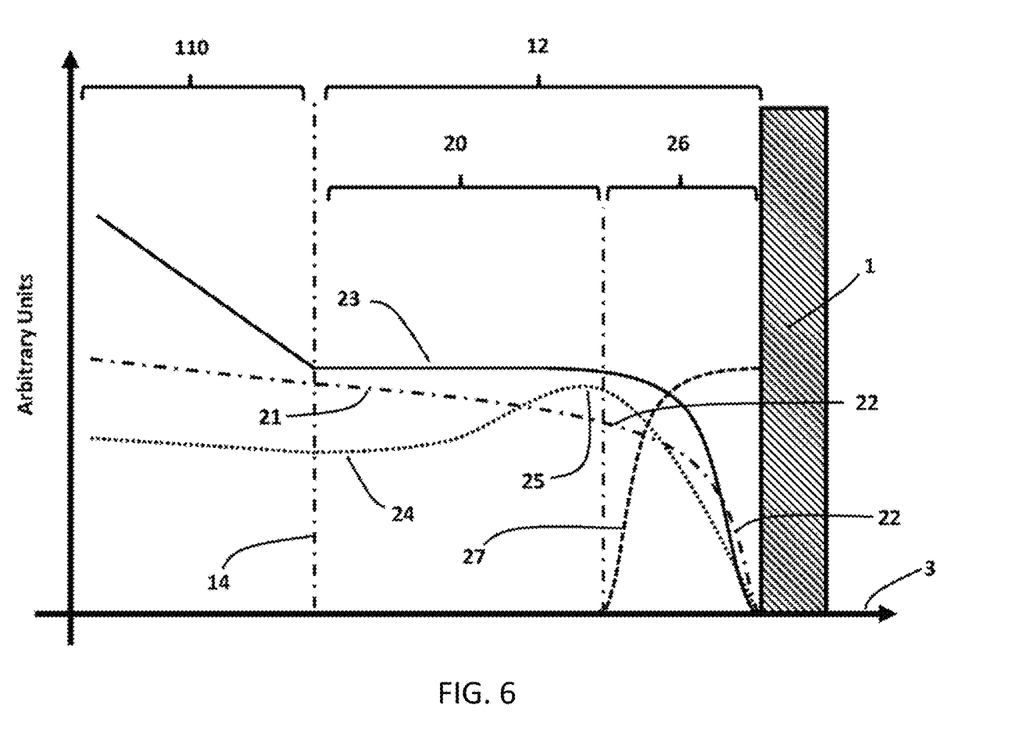
FIG. 6 Is a graph illustrating the radial dependencies of plasma conditions within the core plasma (confined) and stochastic mantle (mantle plasma) of a magnetic fusion device, including plasma temperature, density and pressure, and gas pressure, under conditions of a stochastic magnetic field within the mantle plasma and high plasma collisionality. The conduction-limited and dissipative layers are indicated.

A stochastic mantle 12 is provided. The stochastic mantle 12 includes mantle plasma 13 and is located outside of the toroidal fusion core plasma 110. The stochastic mantle 12 has a stochastic magnetic field. The stochastic magnetic field has magnetic fields lines that circumnavigate the toroidal fusion core plasma 110. The magnetic field lines move in a toroidal direction 2 and diffuse in radial 3 and poloidal 4 directions. A first portion of the magnetic field lines intersect the interior plasma-facing component 1 of the surrounding plasma chamber 11. The stochastic mantle 12 allows energy losses from the toroidal fusion core plasma 110 to the interior plasma-facing component 1 along the magnetic field lines by particle and thermal transport.

The stochastic mantle 12 is generated without degrading confinement of the toriodal fusion core plasma 110. The stochastic mantle 12 is configured with the magnetic field lines providing a flux of particles, plasma momentum and energy along the magnetic field lines corresponding to radial flux based on the stochastic magnetic field. The first portion of the magnetic field lines that intersects with the interior plasma-facing component 1 is configured with the combination of external magnets and internal electric currents flowing within the toroidal fusion core plasma 110 to provide uniform deposition of the power incident on a surface of the interior plasma-facing component 1. The stochastic mantle 12 separates the toroidal fusion core plasma 110 from the interior plasma-facing component 1. The stochastic mantle 12 has a first radial width and high collisionality. The first radial width and the high collisionality permit development of parallel-field plasma temperature gradients and dissipative processes. The parallel-field plasma temperature gradients and dissipative processes provide cold plasma conditions adjacent the interior plasma-facing component 1.

The cold plasma conditions adjacent to the interior plasma-facing component 1 provide low particle energies for the particles striking the interior plasma-facing component 1. The low particle energies reduce physical sputtering, thereby reducing erosion of the interior plasma-facing component 1. The dissipative processes within the stochastic mantle include plasma-neutral interactions with neutral particles. The plasma-neutral interactions elevate gas pressure 27 adjacent the interior plasma-facing component 1 to facilitate removal of fusion-ash gas through pumping ducts 31 connected to vacuum pumps 32. The gas pressure 27 and fusion-ash gas surround the periphery of the toroidal fusion core plasma 110 permit placement of the pumping ducts 31 around the periphery of the toroidal fusion core plasma 110.

The stochastic mantle 12 includes an inner, conduction-limited layer 20 and an outer, dissipative layer 26. The inner conduction-limited layer 20 transmits power by parallel electron heat conduction. The outer, dissipative layer 26, where atoms and molecules are present provides dissipative processes by an interaction of the mantle plasma 13 with the atoms and the molecules. The stochastic mantle 12 protects the interior plasma-facing component 1 of the magnetic fusion device, as the stochastic mantle 12 is global and uniform.

7) In a further variant of the invention, as illustrated in FIGS. 3-4, the stellarator fusion reactor 100 further includes an energetic fusion product ion loss process. The energetic fusion product ion loss process arises from a portion of energetic fusion product ions not transferring energy to the core plasma 10. This portion of the energetic fusion product ions escape the core plasma 10 and reach the periphery of the core plasma 10. The stochastic mantle 12 provides protection of the interior plasma-facing component 1 against the energetic fusion product ion loss process. The protection provided by the mantle plasma 13, includes the atoms and the molecules which reduce energy of the energetic fusion product ions exiting from the core plasma 10 through a friction process, globally protecting the interior plasma-facing component 1 from excessive local incident power density and damage.

8) In a final variant of the invention, as illustrated in FIGS. 1, 2, 5 and 6, the magnetic fusion device 101 further includes an energetic fusion product ion loss process. The energetic fusion product ion loss process arises from a portion of energetic fusion product ions not transferring energy to the toroidal fusion core plasma 110. This portion of the energetic fusion product ions escape the toroidal fusion core plasma 110 and reach the periphery of the toroidal fusion core plasma 110. The stochastic mantle 12 provides protection of the interior plasma-facing component 1 against the energetic fusion product ion loss process. The protection provided by the mantle plasma 13, includes the atoms and the molecules which reduce energy of the energetic fusion product ions exiting from the toroidal fusion core plasma 110 through a friction process, globally protecting the interior plasma-facing components 1 from excessive local incident power density and damage.

The invention claimed is:
1. A stellarator fusion reactor comprising:
a toroidal vacuum vessel having an interior surface, a blanket adjacent to the interior surface, and a plasma-facing component adjacent to an interior portion of the blanket;
a core plasma positioned within the toroidal vacuum vessel,
a mantle plasma positioned within the toroidal vacuum vessel, wherein the mantle plasma forms a mantle around the core plasma, such that the mantle plasma is between the core plasma and the plasma-facing component;
at least one vacuum pump external to the toroidal vacuum vessel;
at least one pumping duct directly fluidly connecting an interior region of the toroidal vacuum vessel to the at least one vacuum pump, with no divertor or limiter where the pumping duct meets the toroidal vacuum vessel;
a plurality of external magnets forming a confining magnetic field and a stochastic magnetic field;
wherein the confining magnetic field is three-dimensional and toroidal and comprises a last flux surface (LCFS) surrounding the core plasma;

wherein the stochastic magnetic field surrounds the confining magnetic field outside of the last close flux surface (LCFS), and wherein the mantle plasma is positioned within the stochastic magnetic field, wherein the mantle plasma is in an opaque condition configured to prevent gas adjacent to the plasma-facing component from penetrating to the confined plasma, wherein the mantle plasma has a high collisionality, wherein the stochastic magnetic field uniformly disperses power from the core plasma such that a peak power density on the plasma-facing component is equal to an average power density of the plasma facing component.

2. The stellarator fusion reactor of claim 1, wherein the blanket comprises a nuclear radiation shield.

3. The stellarator fusion reactor of claim 1, wherein the blanket comprises a tritium breeder.

4. The stellarator fusion reactor of claim 1, the mantle plasma further comprising:
   a conduction limited portion with a radial density profile corresponding to a radial temperature gradient and plasma pressure is conserved along the stochastic magnetic field in the conduction limited portion; and
   a dissipative portion with a gas pressure corresponding to a second lower plasma temperature, arising from the radial temperature gradient, wherein the conduction limited portion is between the last closed flux surface (LCFS) and the dissipative portion, and
   wherein the dissipative portion is between the plasma-facing components and the conduction limited portion.

5. The stellarator fusion reactor of claim 4, wherein the radial density profile in the mantle plasma comprises a radial rise in density of the mantle plasma in the conduction limited portion as temperature of the mantle plasma in the conduction limited portion decreases in the radial direction and plasma pressure is conserved along the stochastic magnetic field in the conduction-limited portion.

6. The stellarator fusion reactor of claim 4, further comprising a gas layer between the mantle plasma and the plasma-facing component of the toroidal vacuum vessel, wherein a gas pressure in the gas layer increases as the mantle plasma temperature decreases in the dissipative portion.

7. The stellarator fusion reactor of claim 4, wherein a temperature of the mantle plasma is lower in the dissipative portion relative to a temperature of the conduction limited portion.

8. The stellarator fusion reactor of claim 4, wherein:
   the core plasma is at a first higher temperature and the mantle plasma is at a second lower temperature; and
   wherein the core plasma at the LCFS and the mantle plasma in the conduction-limited portion is at a first plasma pressure and the remaining mantle plasma adjacent to the plasma-facing component is at a second lower plasma pressure.

9. The stellarator fusion reactor of claim 1, wherein the plasma-facing component is actively-cooled.

10. The stellarator fusion reactor of claim 4, wherein the mantle plasma comprises a radial temperature gradient, wherein the temperature of the mantle plasma adjacent the plasma-facing component is lower than the mantle plasma temperature at the LCFS.

* * * * *